Nov. 7, 1939.  E. J. MONTAGUE  2,179,050
VEGETABLE SLICER AND FRENCH FRIED POTATO CUTTER
Filed May 21, 1938  2 Sheets-Sheet 1
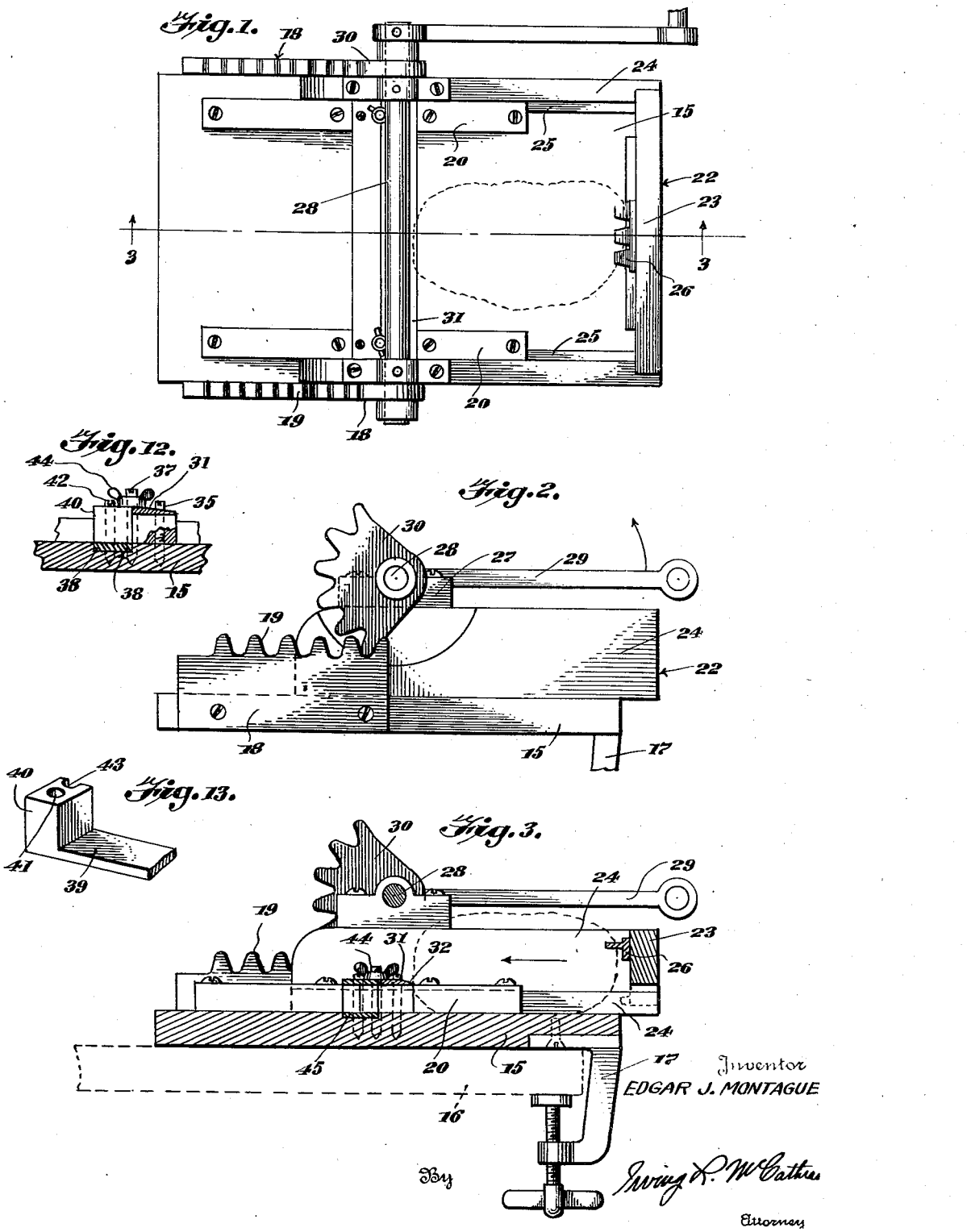

Nov. 7, 1939.  E. J. MONTAGUE  2,179,050
VEGETABLE SLICER AND FRENCH FRIED POTATO CUTTER
Filed May 21, 1938  2 Sheets-Sheet 2
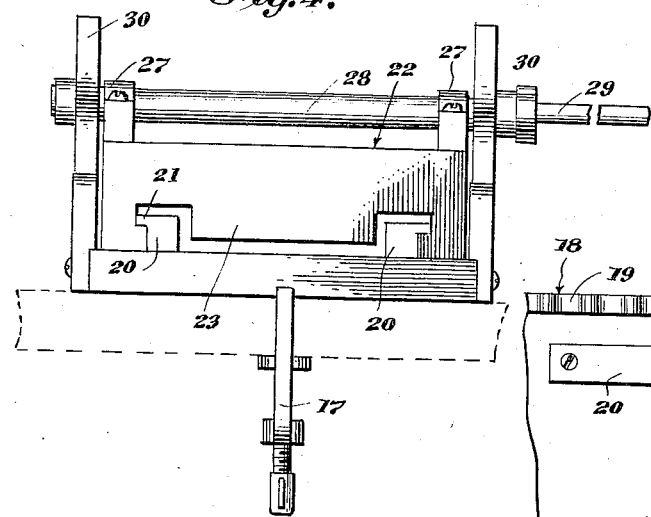
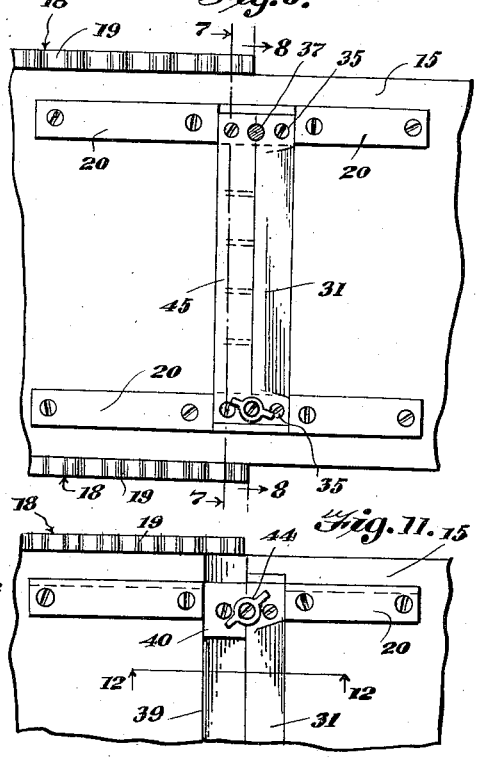
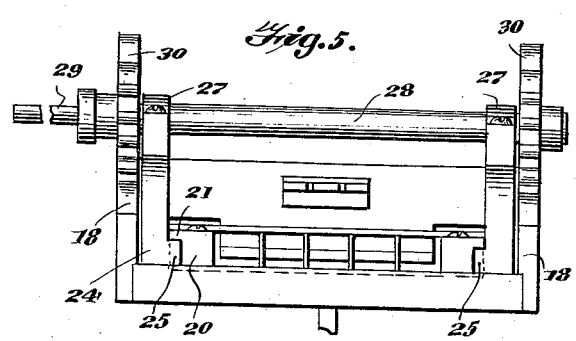
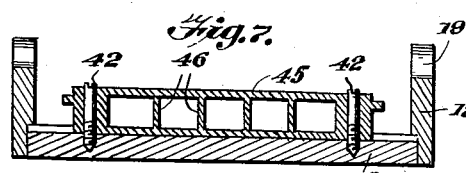
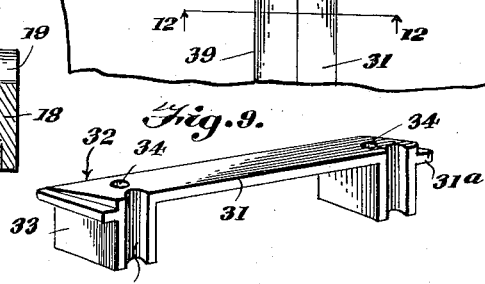
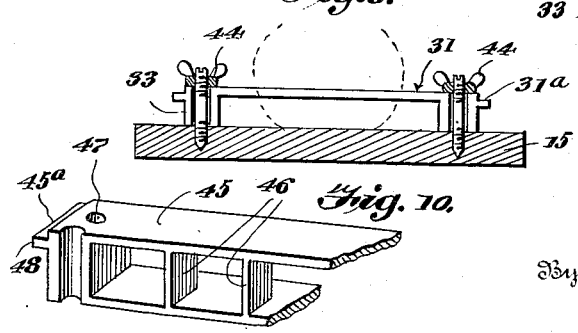
Inventor
EDGAR J. MONTAGUE
By Irving R. McCathran
Attorney Patented Nov. 7, 1939

2,179,050

UNITED STATES PATENT OFFICE 2,179,050

VEGETABLE SLICER AND FRENCH FRIED POTATO CUTTER

Edgar J. Montague, Cortland, N. Y.

Application May 21, 1938, Serial No. 209,354

1 Claim. (Cl. 146—168)

This invention relates to a vegetable slicer and French fried potato cutter, and has for one of its objects the production of a simple and efficient means for facilitating the feeding of vegetables toward a cutting knife for the purpose of cutting the vegetables into variously formed slices.

A further object of this invention is the production of a simple and efficient cutting knife supporting means for use upon a vegetable slicer, whereby knives of various sizes and shapes may be substituted to vary the form of slices produced by feeding vegetables through the slicer.

Other objects and advantages of the present invention will appear throughout the following specification and claim.

In the drawings:

Figure 1 is a top plan view of the slicer and cutter;

Figure 2 is a side elevational view of the same;

Figure 3 is a longitudinal sectional view taken on line 3—3 of Figure 1;

Figure 4 is a view of the rear end of the slicer and cutter;

Figure 5 is a front view of the slicer and cutter;

Figure 6 is a fragmentary top plan view of the slicer and cutter showing the central portion thereof;

Figure 7 is a section taken on line 7—7 of Figure 6;

Figure 8 is a section taken on line 8—8 of Figure 6;

Figure 9 is a perspective view of the slicer knife blade;

Figure 10 is a fragmentary sectional perspective view of the French fried potato cutter blade;

Figure 11 is a fragmentary top plan view of a portion of the cutting table or base showing the cutting knife secured thereto;

Figure 12 is a sectional view taken on line 12—12 of Figure 11;

Figure 13 is a fragmentary perspective view of one end of the filler plate used in conjunction with the slicer knife blade.

By referring to the drawings, it will be seen that 15 designates the base or cutting table of the device which may be anchored upon a table or other support, as indicated by the numeral 16, through the medium of a clamp 17 carried by one end of the base 15. The base 15 is provided with rack plates 18, one rack plate being secured to each side edge, as illustrated in Figure 1, the rack plates 18 having rack teeth 19 on the upper faces thereof, as shown in Figures 1 and 2. The base 15 is provided with track rails 20 secured to the upper face thereof, which track rails 20 are provided with overhanging flanges 21, as shown in Figure 4.

A feeder frame 22 is slidably mounted upon the base 15 and comprises a head plate 23 to which head plate 23 are secured the side rails 24, which side rails 24 are provided with track-engaging flanges 25 upon the inner faces thereof, the flanges 25 fitting under the overhanging flanges 21 of the track rails 20. The head plate 23 preferably carries a toothed vegetable engaging grid 26 upon the inner face thereof for engaging a vegetable such as a potato and the like, in the manner as shown in dotted lines in Figures 1 and 3. The side rails 24 carry journal blocks 27 upon which journal blocks 27 is journaled an operating shaft 28. This operating shaft 28 carries an operating crank handle 29 and a plurality of segmental gears 30, the segmental gears 30 being mounted near the respective ends of the shaft 28 and in relative interlocking engagement with the rack plates 18.

A slicing blade 31 is supported transversely of the base 15 preferably just below the shaft 28 having its cutting edge 32 facing the head plate 23. This slicing knife blade 31 is provided with end lugs 33 which are apertured at 34 for fitting over the upstanding posts 35 carried by the base 15, the lugs 33 also having concave vertically extending sockets 36 formed upon their rear faces for fitting around the upstanding intermediate binding posts 37 also carried by the base 15. When it is desired only to slice a vegetable, the knife 31 is used and a filler strip 38 fits within a socket 39 formed in the upper face of the base 15 adjacent the knife 31, this filler strip 39 having upstanding lugs 40, the lugs 40 being located at each end and having apertures 41 for fitting over the anchoring posts 42. The lugs 40 are also provided with concave notches 43 for partly fitting around the binding posts 37, in a manner as shown in Figure 11. Thumb nuts 44 are threaded upon the upper ends of the binding posts 37, the nuts 34 spanning the lugs 40 and the knife 31 in the manner shown in Figure 11 for holding the lugs 40 and the knife 31 in a set position.

When it is desired to cut the sliced vegetables such as sliced potatoes, into strips such as are commonly used in making French fried potatoes, a cutter blade 45 is substituted for the filler strip 39, the cutter blade 45 having vertically extending cutting ribs 46 arranged in spaced relation longitudinally of the blade, the cutting strips 46 extending transversely of the blade. The cutter blade 45 is provided with apertures 47 at the respective ends thereof for fitting over the posts 42 and the ends are notched, as at 48, for partly fitting around the binding posts 37 whereby the cutter blade or knife 45 and the slicer blade or knife 31 may be locked in unison in position, as shown in Figure 3, by means of the thumb nuts 44. The cutter blade 45 is provided with flanges 45a at the ends thereof to facilitate the removal and the lifting of the cutter blade 45 from the posts 42. The blade 31 is also provided with lifting flanges 31a at their respective ends similar to the flanges 45a.

It will be seen that the cutter blade or knife 45 is interchangeable with the filler plate or strip 39 permitting the operator to either slice a vegetable by using only the knife blade 31 or by cutting the vegetable into narrow strips such as are used for French fried or string potatoes, by placing the cutter blade 45 in position in place of the filler strip 39.

From the foregoing description, it will be seen that a very simple and efficient means has been provided for slicing a vegetable such as a potato and the like, in flat strips, or cutting the same into narrow strips for preparing either home fried potatoes or French fried potatoes, merely by a selected replacement of the cutter blades. As the vegetable is placed in the position shown in dotted lines in Figures 1 and 3, and the crank handle 29 is moved in the position indicated by the arrow in Figure 2, the feeder frame 22 will be moved longitudinally of the base 15 in the direction of the arrow indicated in Figure 3, forcing the vegetable against the cutting edge 32 of the knife 31, and in this manner cutting the vegetable into the desired strips.

It should be understood that certain detail changes in the mechanical construction may be employed without departing from the spirit of the invention so long as such changes fall within the scope of the appended claim.

Having described the invention, what I claim is:

A vegetable slicer comprising a base, a feeder frame for feeding a vegetable longitudinally of the base, a cutting knife carried by the base in the path of movement of the feeder frame, a second cutter knife mounted on the base in abutting relation with respect to the first mentioned knife, upstanding anchoring posts carried by said base, each knife having apertures through which said posts extend, the second mentioned knife having vertically extending spaced cutting strips, a binding post engaging the abutting knives and overhanging thumb nuts carried by the binding posts and engaging the knives for holding the knives against accidental displacement from the base.

EDGAR J. MONTAGUE.